United States Patent
Detienne et al.

(10) Patent No.: US 9,674,285 B2
(45) Date of Patent: Jun. 6, 2017

(54) BYPASSING FAILED HUB DEVICES IN HUB-AND-SPOKE TELECOMMUNICATION NETWORKS

(71) Applicant: Cisco Technology, Inc., San Jose, CA (US)

(72) Inventors: Frederic Detienne, Harze (BE); Mark Comeadow, Berkshire (GB); Padmakumar Av, Bangalore (IN); Thamilarasu Kandasamy, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 14/505,161

(22) Filed: Oct. 2, 2014

(65) Prior Publication Data
US 2016/0098327 A1   Apr. 7, 2016

(51) Int. Cl.
*H04L 29/08* (2006.01)
*H04L 29/14* (2006.01)
*H04L 29/06* (2006.01)

(52) U.S. Cl.
CPC ............ *H04L 67/142* (2013.01); *H04L 69/40* (2013.01); *H04L 63/0272* (2013.01)

(58) Field of Classification Search
CPC .............................. G06F 11/181; H04L 67/142
See application file for complete search history.

(56) References Cited

U.S. PATENT DOCUMENTS

| 6,335,937 B1* | 1/2002 | Chao ...................... H04L 69/40 370/216 |
| 7,844,719 B2* | 11/2010 | Detienne ............. H04L 12/2602 709/225 |

* cited by examiner

Primary Examiner — Bryce Bonzo
Assistant Examiner — Katherine Lin
(74) Attorney, Agent, or Firm — Hickman Palermo Becker Bingham LLP; Malgorzata A. Kulczycka

(57) ABSTRACT

In an embodiment, a method comprises using a first hub device: establishing one or more secure connections with one or more spoke devices logically arranged as spokes with respect to a data processing system; generating and sending via a high-speed link a hub probe to a second hub device; in response to determining that the second hub device is nonresponsive, transmitting, to the one or more spoke devices a first communication indicating that the second hub device is nonresponsive; using a spoke device, receiving the first communication indicating that the second hub device is nonresponsive; determining whether the spoke device has established a secure connection with the second hub device; in response to determining that the spoke device has established the secure connection with the second hub device, selecting a third hub device, establishing a secure connection with the third hub device, and communicating with the third hub device.

20 Claims, 14 Drawing Sheets

BYPASSING FAILED HUB DEVICES IN HUB-AND-SPOKE TELECOMMUNICATION NETWORKS

TECHNICAL FIELD

The present disclosure generally relates to managing internetwork devices in response to failures. More specifically, the disclosure relates to techniques for reconfiguring hub devices in networks with hub-and-spoke topologies in response to a failure of a hub device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Hub-and-spoke topologies may be used in telecommunications networks and typically involve one or more hub devices in relatively centralized logical positions coupled to other internetworking devices in spoke positions; traffic directed from one spoke device to another spoke device generally is routed through one or more of the hub devices. Consequently, the failure of one of the hub devices may be a significant issue and internetworking architects desire to improve the availability of such networks in the face of a failure of a hub. Implementations of high availability (HA) mechanisms in a allow redirecting data traffic away from a failed node in a relative short period of time. However, since the HA mechanisms are typically implemented using stateful switchover approaches, the implementations rarely ensure at least 99.999% availability of the network, which is a goal of some network managers to provide the best user experience.

Stateless, probe-based HA mechanisms are usually implemented in network configurations in which the spoke devices are multi-homed, and rely on routing protocols to determine whether data traffic is to be switched to other nodes. Examples of such protocols include the Dead Peer Detection (DPD) protocol or the routing protocol hold-time mechanism. However, such implementations are inherently slow and typically generate a significant amount of background traffic. An increase in the background traffic may be caused by a large amount of probes disseminated in a network, which may also cause obtaining false-positive results, and eventually destabilize the network.

In some HA implementations, the Bidirectional Forwarding Detection (BFD) protocol or the Internet-Key Exchange (IKE) protocol may be used. However, such implementations may cause issues with a network scalability and reliability similar to other stateless, probe-based mechanisms.

DETAILED DESCRIPTION OF EXAMPLE EMBODIMENTS

Figure 1:
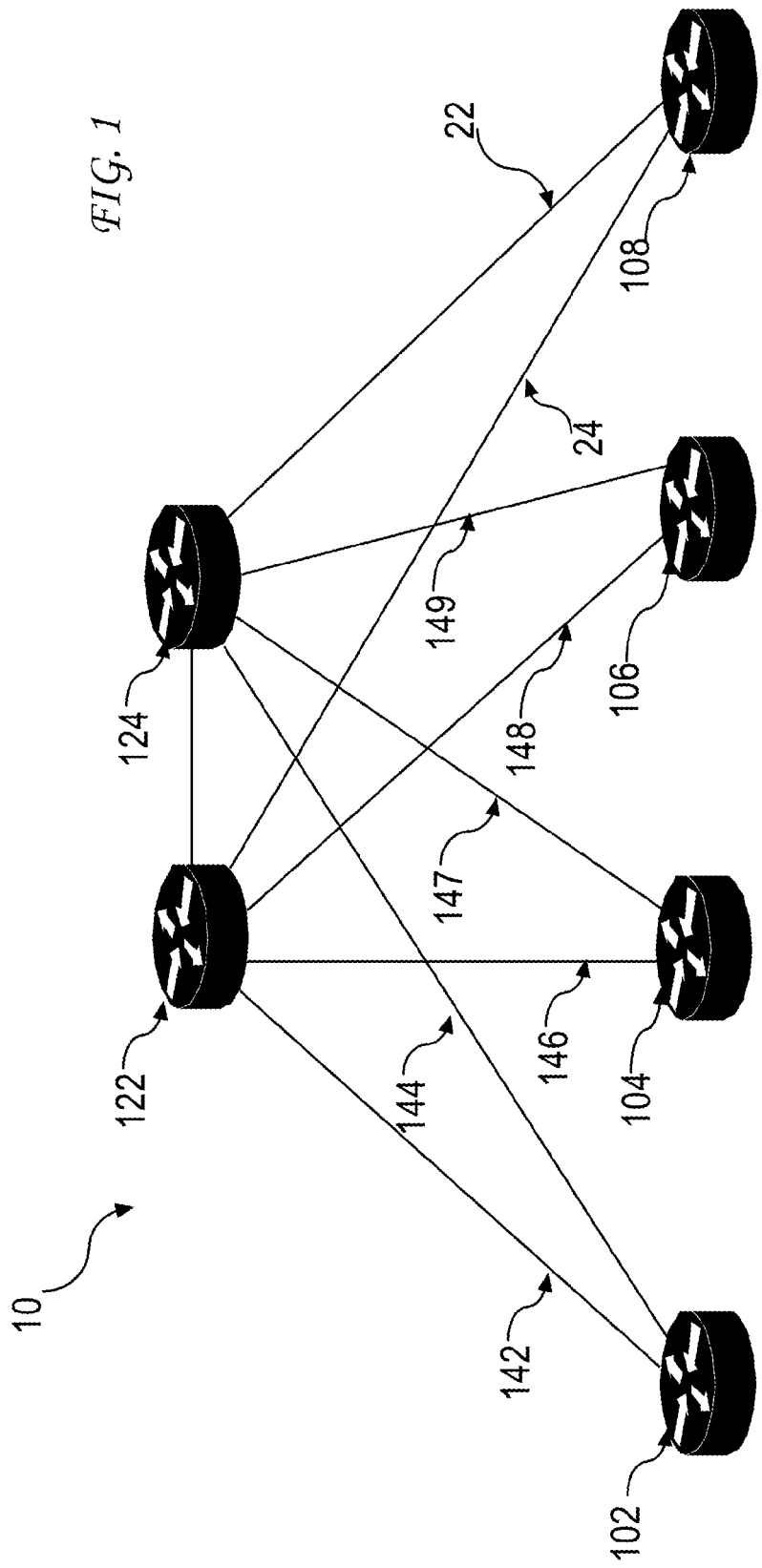
FIG. 1 illustrates an example of a network environment for implementing an event-driven, stateless high availability mechanism to address failure of hub devices in a hub-and-spoke network topology.

In the following description, for the purposes of explanation, numerous specific details are set forth in order to provide a thorough understanding of the present approach. It will be apparent, however, that the present approach may be practiced without these specific details. In other instances, well-known structures and devices are shown in block diagram form in order to avoid unnecessarily obscuring the present approach.

1. General Overview

Embodiments provide an event-driven, stateless high availability mechanism to address the failure of a hub device in a hub-and-spoke network topology. In an embodiment, one or more spoke devices (logically arranged as spokes with respect to a data processing system) establish a secure connection with a first and second hub devices. Traffic can flow independently from spoke to the first or second hub.

The first hub device also generates and sends a hub probe to a second hub device. The hub probe is configured to determine whether the second hub device is responsive. These probes are reflexive in the sense that the second hub device also probes for the first hub device.

In response to determining that the second hub device is nonresponsive, the first hub device transmits to one or more spoke devices over one or more secure connections, a first communication indicating that the second hub device is nonresponsive.

Upon receiving the first communication indicating that the second hub device is nonresponsive, a spoke device determines whether the spoke device has established a secure connection with the second hub device. If the spoke has established the secure connection with the second hub device, then the spoke suspends data plane forwarding to the second hub while it tries to re-create or re-validate the connection information with the second hub. During this time, communication only flows between the spokes and the first hub. The recovery time is the time it takes spokes to stop using the path faulty hub (black holing traffic) and only use the path the primary hub. Using this approach, the time during which a network recovers from a failure may be the same as if a stateful approach were implemented. Furthermore, in this approach, the network resilience to the communications errors is usually higher than if conventional stateful failover approaches are used. This method is also more scalable and less prone to false positives than if the spokes probed the hub at a sufficiently high frequency as to detect hub failure in the same interval of time.

In an embodiment, a stateless HA mechanism is implemented in a computer network 150, and is based on a simple approach for delivering a high availability network. Because of its simplicity, the HA mechanism is easy to implement and deploy in a variety of computer networks. The presented HA mechanism does not impede the scalability of computer networks. Indeed, it is easily scalable and applicable to growing networks.

"Stateless" in this context means omitting the need to communicate, from an active hub to a standby hub, connection state information that otherwise must be communicated to the standby hub when a conventional stateful switchover approach is used. "Event-driven" in this context means that the execution of the approach is triggered when an event, such as a hub-failure, is detected, and that the execution of the approach is not triggered when the event is not detected.

The mechanism described herein does not necessitate load balancing over the first and second hub. Spokes may prefer sending all their traffic to one of the hubs under normal conditions; this is dependent on the administrative policy of the spokes. This mechanism switches the forwarding decision to a remaining, working device as efficiently as a stateful mechanism. One of the advantages of this mechanism is that it also permits load balancing in its non-failed state which a stateful mechanism does not allow.

This mechanism can work with spokes connected to more than two hubs. Since the keepalive mechanism is less time sensitive and less verbose as the stateful synchronization mechanism, it also permits a geographic distribution of the hubs allowing for highly resilient site-wide disaster recovery network designs.

2. Structural Overview

In hub-and-spoke networks, hub devices may be implemented in multiport repeaters that repeat data received on the data ports. Such hubs usually do not perform any filtering or processing of the data. Other hubs may be implemented in routers or switches. Such hubs may be configured to further examine or manage the received data traffic. Hubs may comprise internetworking routers, switches, and other elements of network infrastructure. Spokes typically are end station computer devices such as servers, personal computers, workstations, printers, and other computing devices.

2.1 Spoke-Hub Configurations

FIG. 1 illustrates an example of a network environment in which an event-driven, stateless HA mechanism to address failure of hub devices in a hub-and-spoke network topology may be used. In an embodiment, network environment 10 comprises one or more hubs 122, 124 and one or more spokes 102, 104, 106, 108. Hubs 122, 124 are configured to receive data traffic from spokes 122, 124, and transmit the received traffic to other spokes and/or hubs. Spokes 102, 104, 106, 108 communicate with other spokes via hubs 122, 124. Spokes 102, 104, 106, 108 are referred to as spoke clients or just clients. Hubs 122, 124 are referred to as server hubs or central hubs.

For purposes of illustrating a clear example, network environment 10 comprises two hubs 122, 124, and four spokes 102, 104, 106, 108. However, other implementations may include any number of hubs and any number of spokes. Furthermore, some networks may include several layers of hubs, and several layers of spokes.

Each of the hubs 122, 124 and spokes 102, 104, 106, 108 comprises hardware logic or stored programs that are configured to implement the techniques that are described herein. In one embodiment, the stateless HA mechanism to address failure of hub devices in a hub-and-spoke network topology described herein may be implemented in hardware of the hubs and spokes; other embodiments may use implementations in software or firmware. For example, the techniques that are described functionally herein may be implemented in computer programs written in any of a variety of programming languages, such as JAVA, and implemented as services or function calls within a larger operating environment. In one embodiment, each of the hubs and spokes of FIG. 1 comprises a router, switch or other internetworking device of the type commercially available from Cisco Systems, Inc., San Jose, Calif., and the techniques herein may be programmed as part of Cisco IOS Software.

Network environment 10 depicted in FIG. 1 includes spokes that are double-homed. A double-homed spoke is a spoke that communicates with at least two hubs. For example, spoke 102 may be configured to communicate data to hub 122, which may be an active hub, and to hub 124, which may be a standby hub. In this specific example, both hubs are active, i.e. spoke 102 may communicate the data to hub 122 via a communications link 142, and simultaneously communicate data to hub 124 via a communications link 144. Spoke 104 may communicate data to active hub 122 via a communications link 146 and the data to standby hub 124 via a communications link 147. Spoke 106 may communicate data to active hub 122 via a communications link 148 and the data to standby hub 124 via a communications link 149. Spoke 108 may communicate data to active hub 122 via a communications link 24 and the data to standby hub 124 via a communications link 22. Other arrangements between the spokes and the hubs may also be created. For example, additional spokes, hubs and communications links may be added to the network.

Protocols such as the Dynamic Multipoint Virtual Private Network (DMVPN) protocol and the Flexible Virtual Private Network (FlexVPN) protocol do not provide high availability mechanisms that can fully address the issues identified herein. Even if the spokes are double-homed, when a particular hub fails, the spokes that communicated with the particular hub need to establish connections with new backup hubs. Reestablishing the connections with the new hubs may be time consuming, and may negatively impact the reliability of the network.

2.2 Event-Driven, Stateless High Availability Approach to Address Hub Failure

Figure 2:
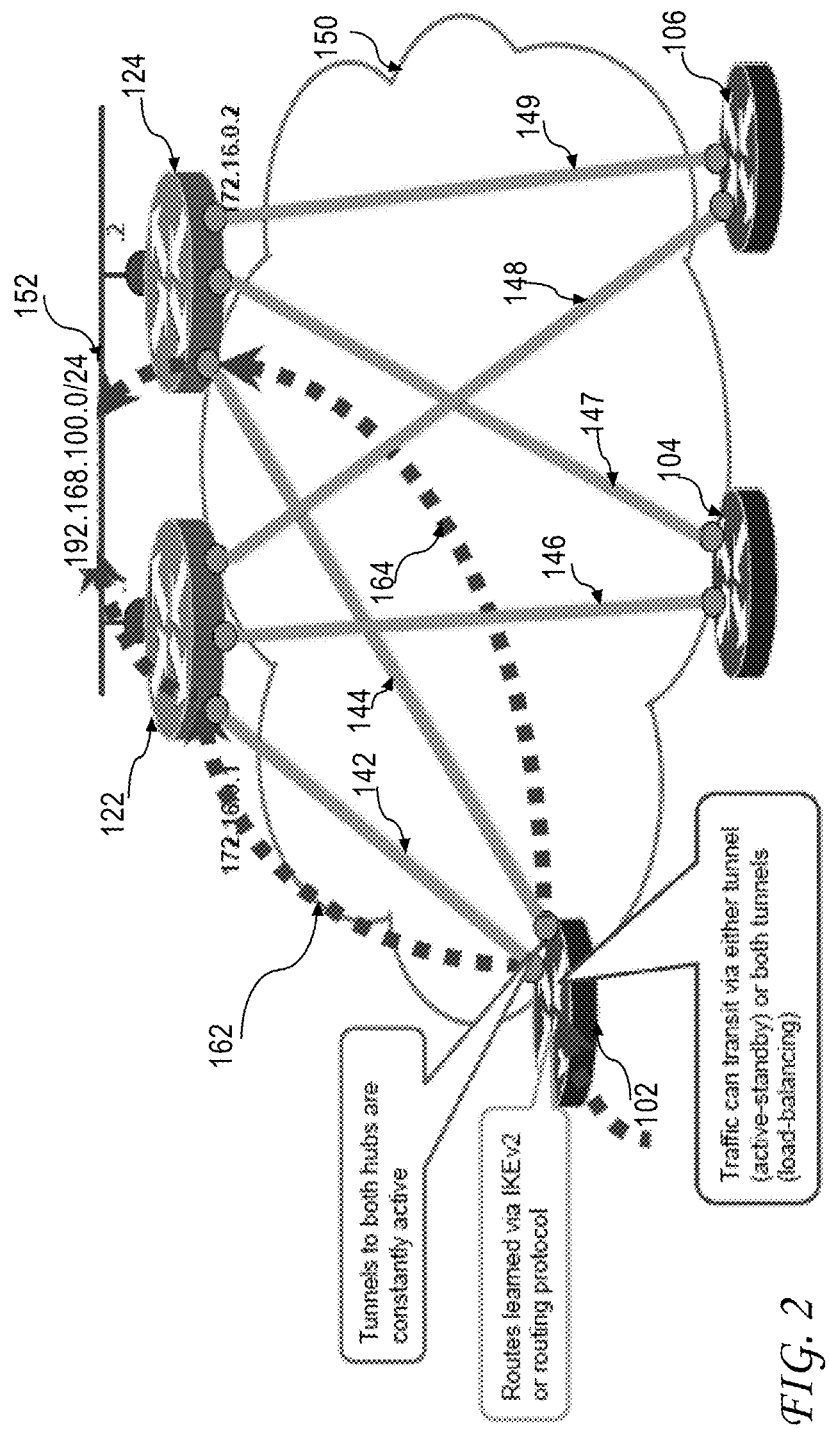
FIG. 2 illustrates an example of implementing an event-driven, stateless high availability approach to address failures of hubs.

FIG. 2 illustrates an example of implementing an event-driven, stateless high availability approach to address failures of hubs. For purposes of illustrating a clear example, FIG. 2 depicts two hubs and three spokes, but other network configurations in other embodiments may include additional spoke clients and additional hubs. To connect to the hubs, spoke clients may use public addresses, such as for example, an address 152. In the depicted example, public address 152 the IP address 102.158.100.0/24. Other types of addresses and address configuration may be used.

In an embodiment, spoke client 102 establishes communications connections with two or more hubs. For example, spoke client 102 may send a request to connect to a virtual address, for example 172.16.0.1, of hub 122. The request may be sent in accordance with a communications protocol implemented in the network. If the request is accepted and acknowledged, spoke client 102 and hub 122 may establish a communications tunnel 142 between each other.

In addition, spoke client 102 may send a request to connect to a virtual address, for example 172.16.0.2, of hub 124. A route to hub 124 may be learned via any routing protocol, including IKEv2. The request may be sent in accordance with a communications protocol implemented in the network. If the request is accepted and acknowledged, spoke client 102 and hub 124 may establish a communications tunnel 144 between each other.

Once communications tunnels 142 and 144 are established, data traffic received by spoke client 102 may be transmitted from spoke client 102 to hub 122 via communications tunnel 142, and/or to hub 124 via communications tunnel 144. Alternatively, the data traffic may be transmitted from spoke client 102 to both hub 122 and hub 124, via the corresponding communications tunnels 142, 144. If additional communications connections with other hubs are established from the spoke client 102, then the data traffic may be sent to the additional hubs as well.

In an embodiment, tunnels established by spokes to hubs remain active. For example, as indicated using a data transit tunnel 162, data traffic received by spoke client 102 may be transmitted from spoke client 102 to hub 122, and then to other nodes. Furthermore, as indicated using a data transit tunnel 164, data traffic received by spoke client 102 may be transmitted from spoke client 102 to hub 124, and then to other nodes.

Figure 3:
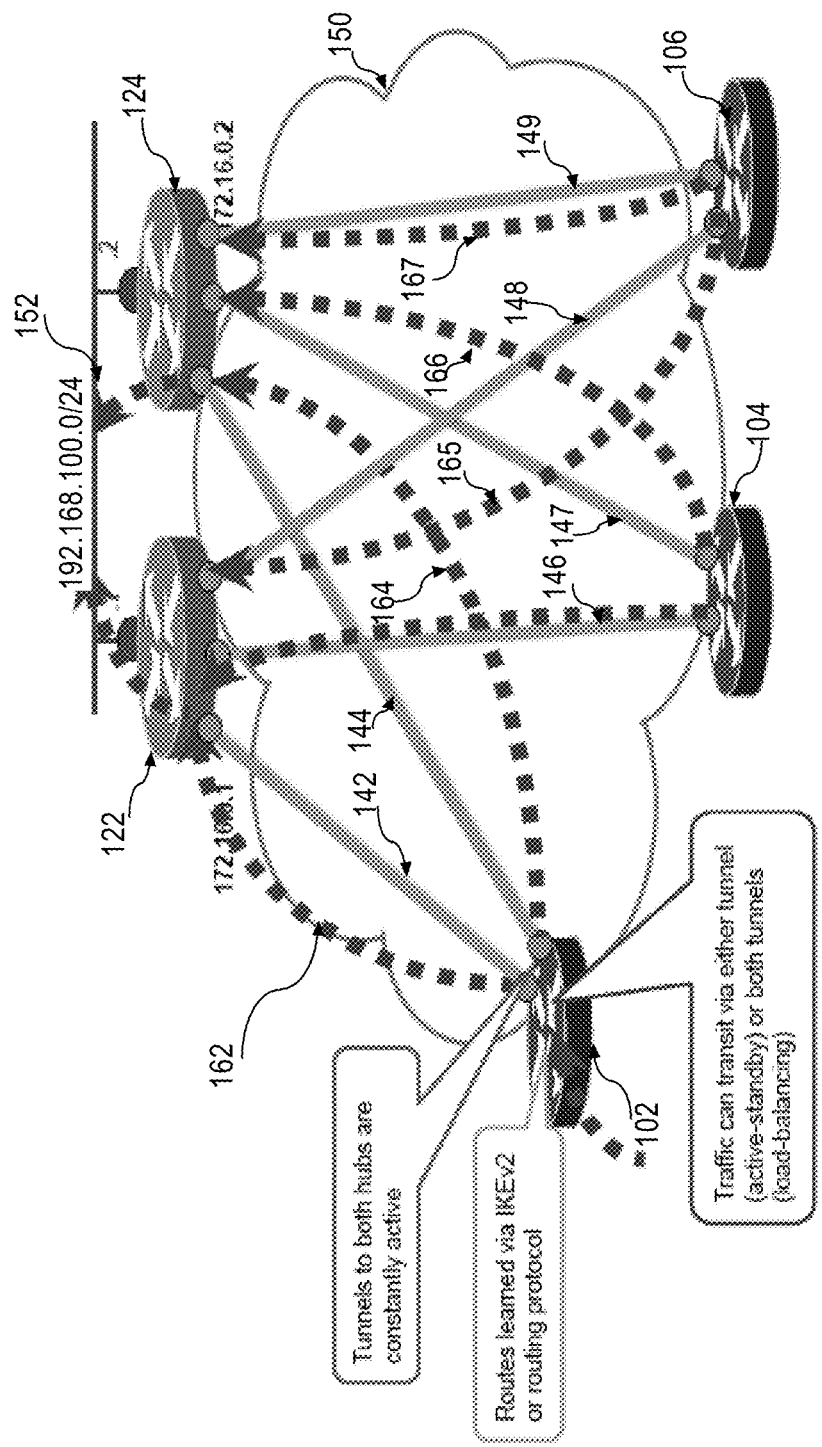
FIG. 3 illustrates an example of implementing an event-driven, stateless high availability approach to address failures of hubs.

FIG. 3 illustrates an example of implementing an event-driven, stateless high availability approach to address failures of hubs. In FIG. 3, spoke clients 102, 104 have established connections with hubs and other spoke clients. For example, spoke client 104 may establish a communications tunnel 146 with hub 122 and a communications tunnel 147 with hub 124, while spoke client 106 may establish a communications tunnel 148 with hub 122 and a communications tunnel 148 with hub 124.

If a spoke client determines that a hub with which the spoke client communicates has not failed, but is still operational, then the spoke client may continue transmitting the received data traffic to that hub. For example, if spoke client 102 has established communications connections with hub 122 and hub 124, and spoke client 102 determined that both hubs remain operational, then spoke client 102 may send the data traffic received at spoke client 102 to either hub 122 or hub 124, or to both hubs 122, 124.

2.3 Hub Clustering

In an embodiment, a fast-keep-alive mechanism allows identifying a failed hub in a short period of time. A fast-keep-alive mechanism allows overcoming the limitations that may be introduced by slow-probing mechanisms that are implemented in spokes in other approaches. For example, other approaches may involve using HELLO messages that spoke clients periodically send to hubs at a relatively low, fixed frequency, and the spoke clients may be configured to await a response to a HELLO during a relatively long, fixed time; therefore, conventional HELLO probing is typically slow. In sharp contrast, the fast-keep-alive mechanism described herein may shorten the time needed to detect whether a hub has failed, and thus initiate a network recovery sooner than if a failure detection was based on conventional HELLO messages transmitted by the spokes.

A fast-keep-alive mechanism may be implemented in hubs and/or in spoke clients. If the fast-keep-alive mechanism is implemented in hubs, then it is used by the hubs to determine whether any of the hubs has failed. If the fast-keep-alive mechanism is implemented in spoke clients, then it is used by the spoke clients to determine whether any of the spoke clients has failed.

Determining whether a spoke client transmits data traffic to one of the hubs in a hub cluster or to both hubs is usually made by a system administrator. For example, a system administrator may configure the spokes and hubs either in an "active-standby" mode or in an "active-active" mode. If the active-standby mode is preset, then a spoke client forwards its data traffic to one of the hubs in a hub cluster. If the active-active mode is present, then a spoke client forwards its data traffic to two or more hubs in the hub cluster.

Figure 4:
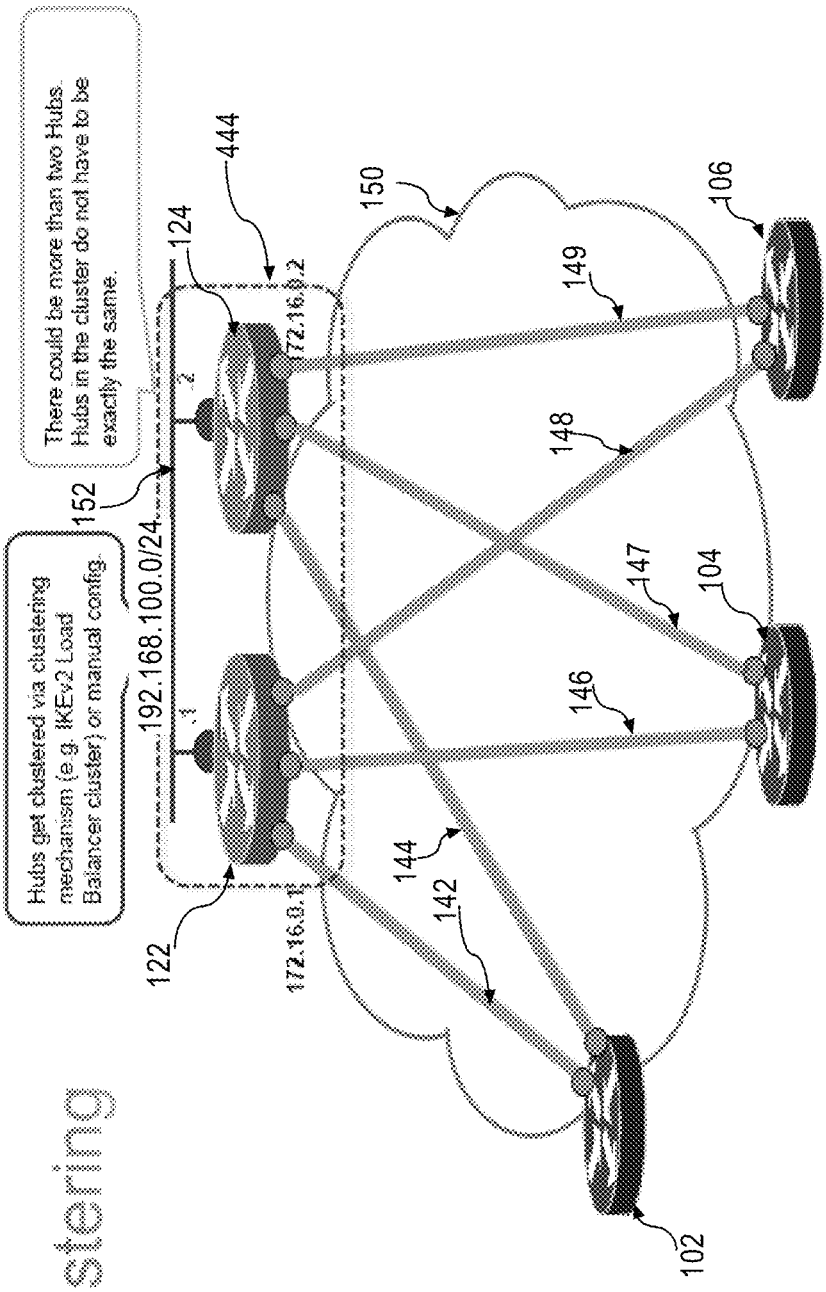
FIG. 4 illustrates an example of a hub cluster.

FIG. 4 illustrates an example of a hub cluster that is used to implement a fast-keep-alive mechanism in an embodiment.

In FIG. 4, a hub cluster 444 comprises hubs 122, 124 connected via a communications link 152, and hubs 122, 124 communicate with each other via that link.

For purposes of illustrating a clear example, FIG. 4 illustrates a hub cluster 444 comprising two hubs 122, 124, but the number of hubs in a cluster is not limited to two and other clusters may include three or more hubs. The approach is scalable and allows using clusters of variable sizes and containing any plurality of hubs.

In an embodiment, a master hub is elected from a plurality of hubs in cluster 444. The master hub may be elected from the hubs in the cluster using a variety of approaches. For example, a master hub may be selected randomly. According to another example, a master hub may be selected based on the IP address, based on a geolocation, or other characteristics of the hubs. Furthermore, a master hub may be selected based on the schedule for electing master hubs in a network.

In an embodiment, hubs 122, 124 discover each other by sending HELLO messages via communications link 152.

In an embodiment, communications link 152 is implemented as a high speed communications link and may be configured to support 3-4 Mbits/sec traffic, including fast monitoring mechanisms such as the Hot Standby Router Protocol (HSRP), BFD, and the like. The communications link 152 may be implemented in either the Data Link Layer 2 or the Network Layer 3 of the Open Systems Interconnection Model (OSI) network model.

In an embodiment, communications link 152 is a part of a local area network (LAN) and is implemented locally with respect to the hubs, so communicating HELLO messages via LAN communications link 152 may be performed at a high speed. For example, communications link 152 may allow sending communications at the speed of 3 Mbits/sec, 4 Mbits/sec or in some situations even 10 Mbits/sec, in sharp contrast to other approaches. The ability to send lightweight HELLO messages via a high-speed link, such as link 152, facilitates high-speed "liveness" checks between the hubs in a cluster.

2.4 Hub Detection

Figure 5:
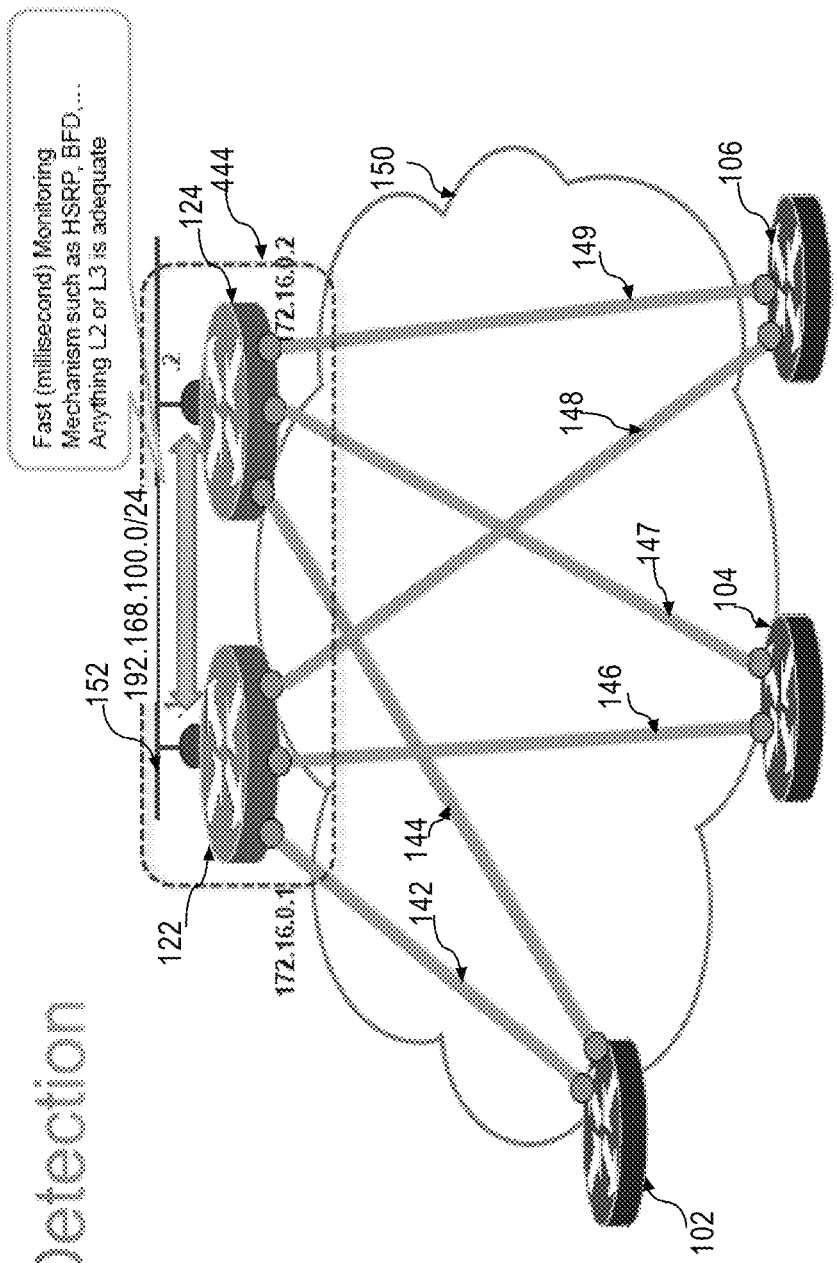
FIG. 5 illustrates an example of an approach for performing hub detection.

FIG. 5 illustrates an example of an approach for a hub-detection. In the depicted example, hubs 122, 124 form a hub cluster 444. Although the example illustrates two hubs in a cluster, the approach is not limited to two hubs. Even though in configuration with three or more hubs in a cluster the data-traffic noise may impact the quality of communications between the hubs, the approach may be implemented in clusters that comprise more than two hubs.

In an embodiment, hubs 122, 124 communicate with each other via a high speed link 152. Hubs 122, 124 may utilize communications exchanged in compliance with various communications protocols. For example, hubs 122, 124 may discover each other by sending HELLO messages via communications link 152 in compliance with the Transmission Control Protocol (TCP), TCP/IP, HSRP or BFD.

Once hubs 122, 124 discover each other, hubs 122, 124 may start probing each other at a very high speed and using communications link 152. Communications link 152 may be implemented on a LAN, and thus may support the high-speed probes. For example, link 152 may be a 10 Mbits/sec link, and may facilitate transmitting high-speed probes at the speed of 3 Mbits/sec, 4 Mbits/sec, or even 10 Mbits/sec.

In an embodiment, hubs 122, 124 monitor each other using various mechanisms, and exchange communications in compliance with protocols such as the HSRP or BFD.

In an embodiment, a high-availability network comprises fewer hubs than spokes. In the depicted example, there are two hubs 122, 124, and three spokes 102, 104 and 106. Because there are fewer hubs than spokes, the hubs can efficiently handle the high-speed probes exchanged between the hubs and the data traffic exchanged with the spokes.

2.5 Failure Detection

Figure 6:
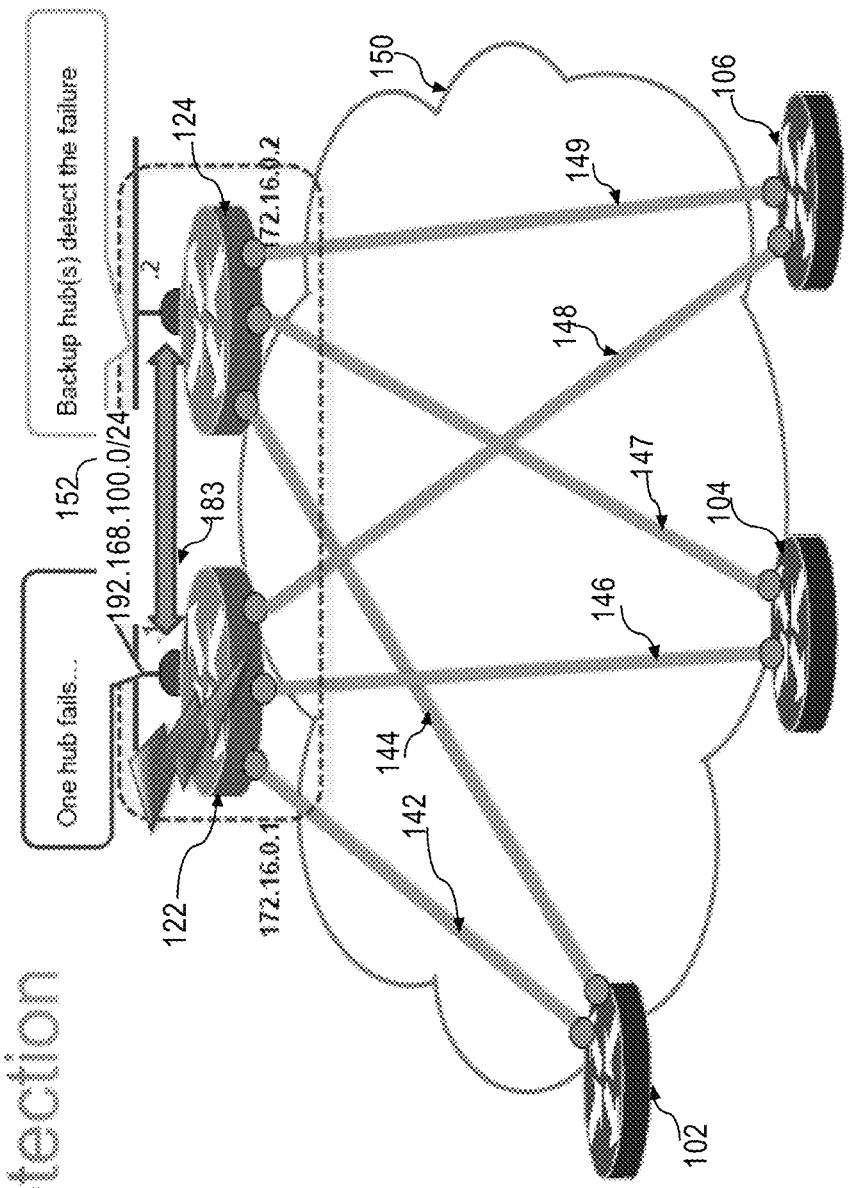
FIG. 6 illustrates an example of an approach for detecting a hub failure.

FIG. 6 illustrates an example of an approach for detecting a hub-failure. Hubs 122, 124 are included in hub cluster 444. The hubs monitor each other by for example sending probes via a high-speed link 152.

If a hub fails, then the failed hub is unable to respond to probes sent by other hubs in cluster 444. For example, if hub 122 fails, then hub 122 is unable to respond to the probes sent by hub 124 to hub 122 via a high-speed link 152.

Because high-seed link 152, small size and ease of processing of the probes facilitate fast communications between hubs, the probes are sent at a high frequency, and the responses to the probes are expected very shortly after the probes were sent. For example, if hub 124 sends a probe to hub 122, but hub 124 does not receive a response to the probe in a short period of time (of the order of the round-trip latency of link 152), then hub 124 determines that hub 122 most likely failed. Thus, a failure of a hub in cluster 444 may be detected and acted upon in a relatively short period of time.

The simplicity of the mechanism makes it also a lot less prone to coding errors and race conditions than stateful mechanisms.

2.6 Failure Notification

In an embodiment, once a hub detects that another hub in a hub cluster has failed, the hub generates a failure notification, and transmits the notification to other nodes. The notification may be sent to all or some spokes in the network. In some implementations, the notification may also be sent to other hubs. The notification may include a message indicating that the nodes should refrain from sending data to the failed hub. The notification may identify the failed hub by an identifier, an IP address or any of the form of identification.

Figure 7:
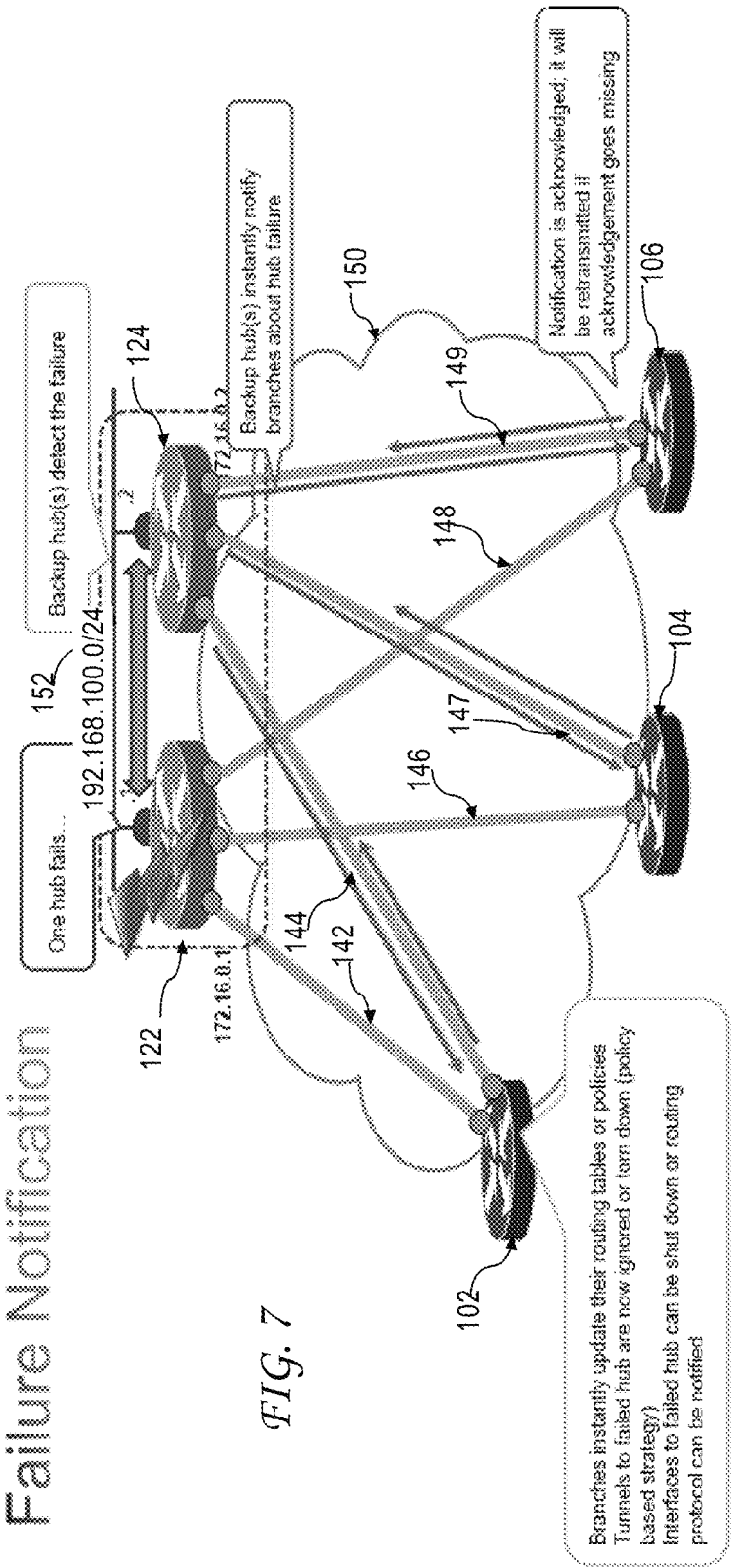
FIG. 7 illustrates an example of an approach for generating and transmitting a failure notification.

FIG. 7 illustrates an example of an approach for generating and transmitting a failure notification. In the depicted example, hub 122 is a failed hub, and hub 124 is a hub that detected a failure of hub 122. Hub 124 detected that hub 122 has failed by sending a probe to hub 122 via a high-speed link 152, and determining that a response to the probe has not been received within a certain period of time.

After hub 124 determined that hub 122 has failed, hub 124 may generate a message to spokes 102, 104, 106 to indicate that spokes 102, 104, 106 may want to refrain from sending data traffic to hub 122. For example, hub 124 may send a message to spoke 102 via a communications link 144 indicating that hub 122 has failed or is otherwise became nonresponsive. Furthermore, hub 124 may send a message to spoke 104 via a communications link 147 to indicate to spoke 104 that hub 122 has failed. Moreover, hub 124 may send a message to spoke 106 via a communications link 149 to indicate to spoke 106 that hub 122 has failed. The messages may be sent to each of the spokes separately, or may be broadcasted to all the spokes in the network.

In addition to the hubs monitoring each other, the spokes may also monitor the hubs. The spokes may monitor the hubs. The spokes may send probes to hubs via communications links 142-149, respectively.

Since spokes can probe hubs at low frequencies, the spokes will most likely receive a hub-failure-notification from other hubs before the spokes can determine by themselves that one of the hubs has failed. For example, if hub 122 fails, then the failure of hub 122 may be very quickly detected by hub 124. Once hub 124 detects that hub 122 failed, hub 124 may very quickly broadcast notifications to spokes 102, 104, 106 to indicate to spokes 102, 104, 106 that the failure of hub 122 has been detected by hub 124. That may be performed before any of the spokes 102, 104, 106 can detect by itself a failure of hub 122.

Upon receiving a notification about a failure of hub 122, spokes 102, 104, 106 may stop sending data traffic to hub 122. Furthermore, spokes 102, 104, 106 may update their routing tables and/or routing policies to reflect the fact that hub 122 has failed and became nonresponsive.

In an embodiment, upon receiving a notification about a failure of hub 122, spokes 102, 104, 106 stop using tunnels established to failed hub 122. In some situations and depending on the policy implemented by the spokes, the tunnels may be torn down.

Furthermore, in some situations the interfaces or connections to a failed hub may be shut down and declared as non-operative. In addition, the spokes may generate and transmit messages in compliance with certain protocols to indicate that the failed hub is non-operative. The messages may also indicate that the spokes are to stop using the failed hub, and start relying on other hubs.

In response to receiving notifications or messages indicating that a particular hub failed, the spokes may send acknowledgements to the notifications/messages. The acknowledgements may contain information about the failed hub and the spoke that generated and transmitted the acknowledgment.

If a hub that notified the spokes about a failure of a particular hub does not receive an acknowledgment to the notification, then the hub may resend the notification to the spokes. For example, the hub may test whether the spokes to which the notifications were sent responded to the notifications within a certain period of time. If the spokes did not respond within the certain period of time, then the hub may retransmit the notifications to either the spokes that failed to acknowledge the notification or to all spokes in the network. The hub may keep retransmitting the notifications until the spokes to which the hub-failure-notification was sent respond, or until a certain time period for retransmitting the notification expires. The determination whether the hub retransmits the notifications, how many times the hub retransmits the notifications and how long the hub waits for acknowledgments to the notifications from the spokes depend on the protocol that the hub and the network implements.

In an embodiment, a failure notification mechanism implemented in hubs is relatively simple. It allows for an early detection of the failed hubs, and an early notification that a particular hub (or hubs) failed. The approach shifts the responsibility of detecting a failure of a hub from the spokes to the hubs, and shifts the responsibility of notifying the failure to other nodes from the spokes to the hubs. Since the hubs communicate with each other using a high-speed link, the hubs may detect a failure of a hub and notify the failure to other nodes faster than this could be done by the spokes. For example, the hubs may detect a failure of another hub within a few seconds, while the spokes that usually send HELLO messages every 15 sec (or in some cases every minute or so) are unable to detect a hub's failure in such a short period of time.

In an embodiment, hubs in a cluster are connected via a LAN. However, the hubs do not have to be collocated. As long as the communications between the hubs may be exchanged at a high speed, the hubs located in a wide area may still deliver a high-availability stateless mechanism. For example, even if the hubs are dispersed geographically and are connected via one or more LAN networks that span several locations, the hubs may still deliver a high-availability stateless mechanism if the hubs may communicate with each other at a high speed.

If a communications network comprises few hubs but many spokes, then the spokes cannot probe the hubs at a high-speed due to the numerosity of the spokes. However, if a network comprises few hubs and few spokes, then it is possible for the spokes to probe the hubs at a high-speed. In this situation, the spokes could detect a failed hub almost as quickly as the hubs could do so. However, typical communications networks comprise relatively few hubs and a large quantity of spokes. Therefore, in typical network the spokes are unable to probe the hubs at a high-speed.

In this approach, hubs advertise failures of other hubs to other nodes, including spokes. The spokes rely on the hubs, not on the spokes, for providing notifications about the failures of other hubs. This is opposite to the conventional approaches, in which the spokes are usually responsible for detecting and advertising failures of other nodes.

3. Failure Bypass

Figure 8:
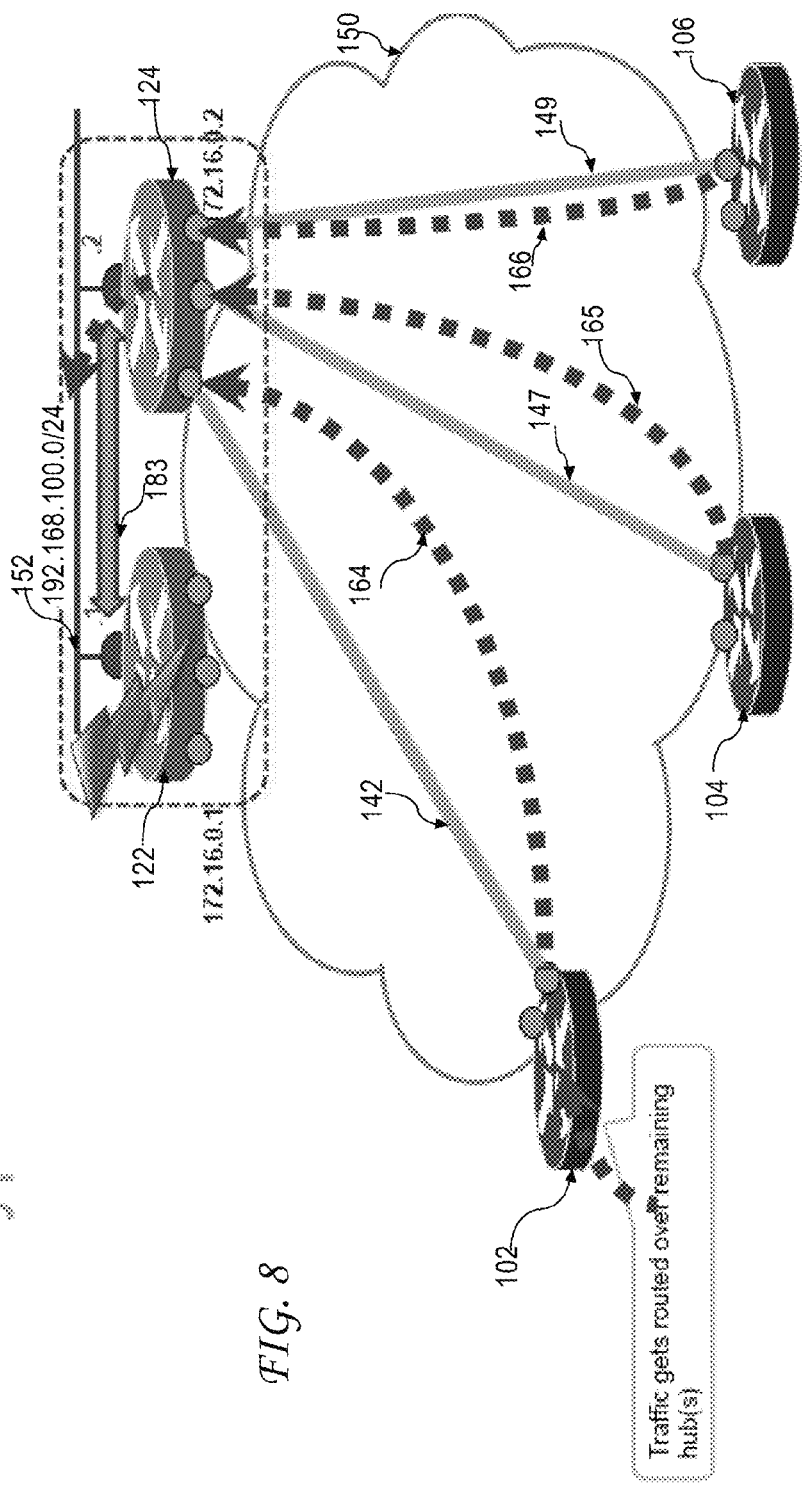
FIG. 8 illustrates an example of an approach for performing a failure bypass.

FIG. 8 illustrates an example of an approach for performing a failure bypass. In the depicted example, hub 124 detects that hub 122 has failed. Hub 124 generates notifications indicating that hub 124 has failed, and transmits the notifications to spokes 102, 104, 106.

In an embodiment, upon receiving a notification that a particular hub has failed, a spoke determines whether, instead of routing data traffic through the particular hub, the spoke may route the traffic through another hub. The spoke may initiate a discovery process to determine whether any other hubs are available. If the spoke determines that there is another hub, which is responsive and operational, then the spoke may start sending the data traffic to that hub, instead of sending the data traffic to the non-responsive hub.

For example, if hub 122 failed and hub 124 sent a notification indicating that hub 122 failed to spokes 102, 104, 106, then upon receiving the notifications, each of the spokes 102, 104, 106 determines how to bypass the failed hub 122. The spokes may try to determine whether hubs other than failed hub 122 are available and responsive. For example, if spoke 102 communicated with hub 122, but not with hub 124, then spoke 102 may establish a communications connection 164 with hub 124, and direct data traffic from spoke 102 to hub 124. If spoke 104 communicated with hub 122, but not with hub 124, then spoke 104 may establish a communications connection 165 with hub 124, and direct data traffic from spoke 104 to hub 124. If spoke 106 communicated with hub 122, but not with hub 124, then spoke 106 may establish a communications connection 166 with hub 124, and direct data traffic from spoke 106 to hub 124.

Figure 9:
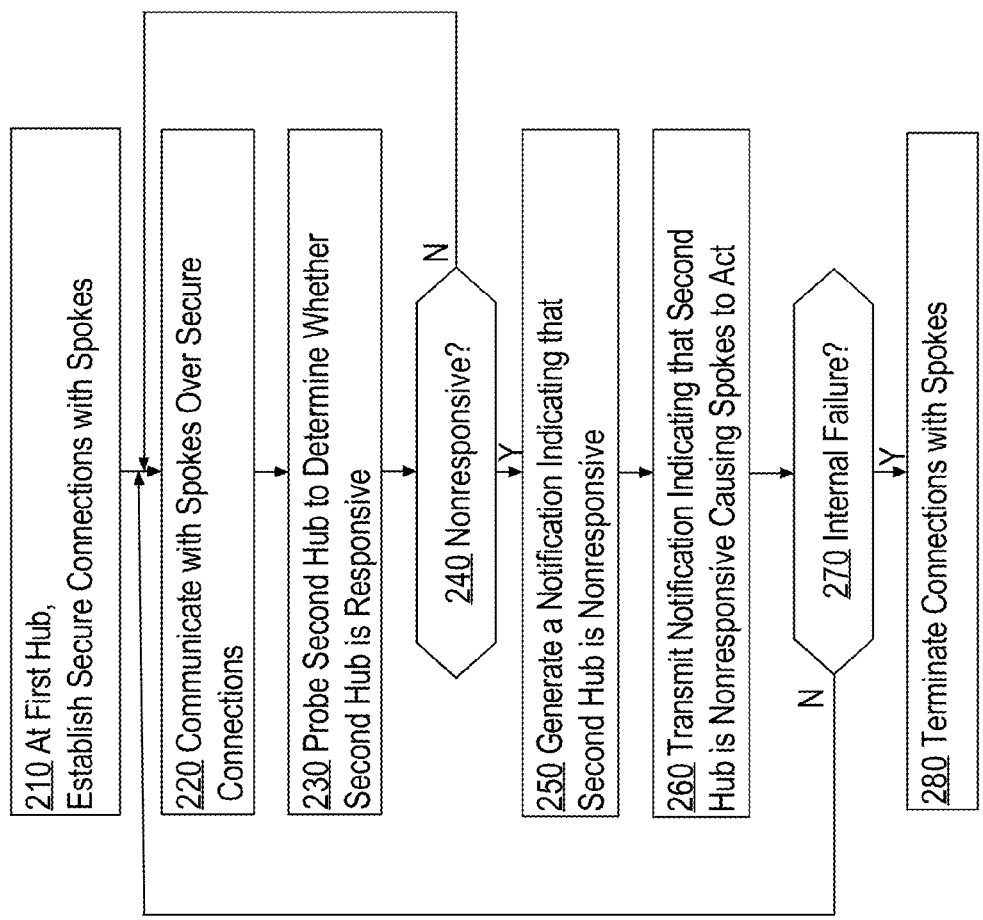
FIG. 9 illustrates a flow chart of an approach for performing a failure bypass.

FIG. 9 illustrates a flow chart of an approach for performing a failure bypass. The steps described in FIG. 9 are performed by a first hub device that is a part of a hub cluster comprising a plurality of hubs.

In step 210, a first hub device establishes one or more secure connections with one or more spoke devices logically arranged as spokes with respect to the data processing system. Once the secure connections with the spoke devices are established, in step 220, the first hub communicates with the spokes using the secure connections.

In step 230, a first hub device generates a probe that is configured to determine whether a second hub device is responsive, and sends the probe to the second hub device.

In step 240, a first hub device determines whether a second hub device is responsive. This may be accomplished by determining whether a response to the probe was received from the second hub device. In an embodiment, after sending the probe to the second hub device, the first hub device may set a timer having a time period during which the first hub device awaits a response to the probe from the second hub device. If the response is not received from the second hub device by the time the timer expires, then the first hub device determines that the second hub device is nonresponsive. Alternatively, the first hub device may repeat sending the probe to the hub device several times, and if the second hub device fails to respond to any of the probes, then the first hub device determines that the second hub device failed.

If a first hub device determines that a second hub device failed, then the process proceeds to step 250. Otherwise, the process proceeds to step 220.

In step 250, a first hub device generates a notification indicating that a second hub device is nonresponsive, and, in step 260, the first hub device transmits the notification to one or more spoke devices over one or more secure connections in a network. The notifications may be sent one by one to each of the spoke devices. Alternatively, the notifications may be broadcast to the spoke devices at the same time.

In step 270, a first hub device checks whether the first hub device itself is operational. For example, the first hub device may check whether all its data ports are operational, whether all components are operational, whether the components found checksum errors, and the like.

If a first hub device determines an internal failure, then the process proceeds to step 280. Otherwise, the process proceeds to step 220.

In step 280, a first hub device terminates secure connections that the first hub device established with spokes. In this step, the first hub device may not be able to notify the spokes that the first hub device became nonresponsive. However, notifying the spokes is not necessary because the failure of the first hub device has been most likely already detected by other hubs in a hub cluster and communicated to the spokes.

Figure 10:
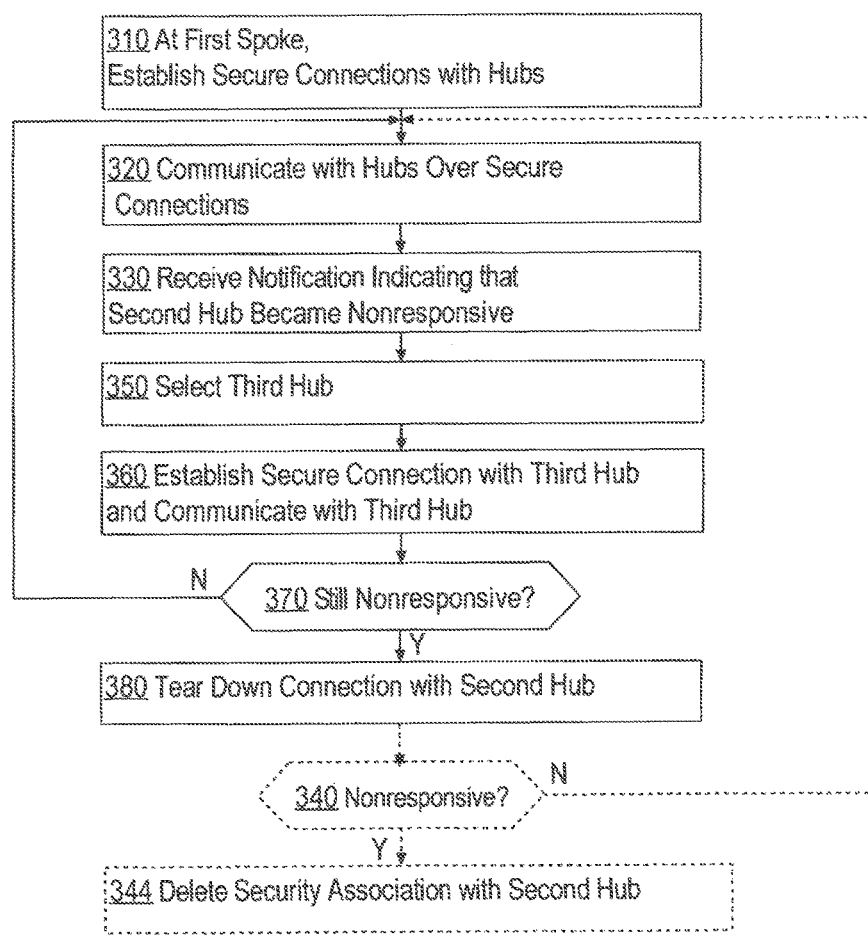
FIG. 10 illustrates a flow chart of an approach for performing a failure bypass.

FIG. 10 illustrates a flow chart of an approach for performing a failure bypass. The steps described in FIG. 10 are performed by a first spoke device that communicates with one or more hubs of a hub cluster.

In step 310, a first spoke device establishes one or more secure connections with one or more hubs.

In step 320, a first spoke device communicates with one or more hubs over one or more secure connections. For example, the first spoke device may send data traffic to the hubs and may receive data traffic from the hubs.

In step 330, a first spoke device receives a notification indicating that a second hub device became nonresponsive. The notification may be received from one of the hubs in a hub cluster. For example, a first hub device may determine that a second hub device has failed, and may send a notification to the first spoke device to indicate that the second hub device has failed.

In step 350, a first spoke device determines whether the first spoke device has established a secure connection with a second hub device. In this scenario, the second hub device is a hub that has failed. If the first spoke device has established a secure connection with the second hub device, but the second hub device has failed, then the first spoke device may want to try to find another hub device that the first hub device may use instead of using the second hub device. For example, the first spoke device may use a discovery process to find a third hub device that is available and responsive.

In step 360, a first spoke device establishes a secure connection with a third hub device, and starts communicating data traffic via the third hub device.

In step 370, a first spoke device tests whether a second hub device is still nonresponsive. The second hub device is a failed hub for which the first spoke device has received a notification indicating that the second hub device has failed. Since it is possible that from the moment when the first spoke device received the notification to the moment when the first spoke device established a "backup" communication with another hub, the second hub device might have recovered and become operational.

If a second hub device still remains nonresponsive, then in step 380, a first spoke device tears down a secure connection that the first spoke device established with the second hub device in the past.

However, if a second hub device became responsive, then a first spoke device does not tear down a secure connection that the first spoke device established with the second hub device in the past. Instead, the first spoke device proceeds to step 320, in which the first spoke device continues communicating with the hub. The first spoke device may reuse the secure connection that the first spoke device established with the second hub device some time in the future.

Step 340 is optional and applies to situations when for example a security association was established between a first spoke device and a second hub device. For example, if a connection between the first spoke device and the second hub device was a secure connection, and the secure connection was established using for example IPsec protocol, then the secure connection is "secured" with a security association. In step 340, the first spoke device may double check whether the second hub device is indeed nonresponsive. For example, the first spoke device may send a probe to the second hub device to test whether the second hub device is indeed nonresponsive. If the second hub device is indeed nonresponsive, then in step 344, the first spoke device deletes a security association created for the secure connection between the first spoke device and the second hub device.

However, if a second hub device became responsive, then a security association established between a first spoke device and the second hub device may be reused. The fact that the security association may be reused in a later point in time may provide some time savings in terms of a network recovery. For example, if the security association is preserved, then to reestablish a secure connection with the second hub device, the first spoke device may reuse the security association instead of initiating the process of creating a new security association. The time saving may vary and may depend on the implementation.

Figure 13:
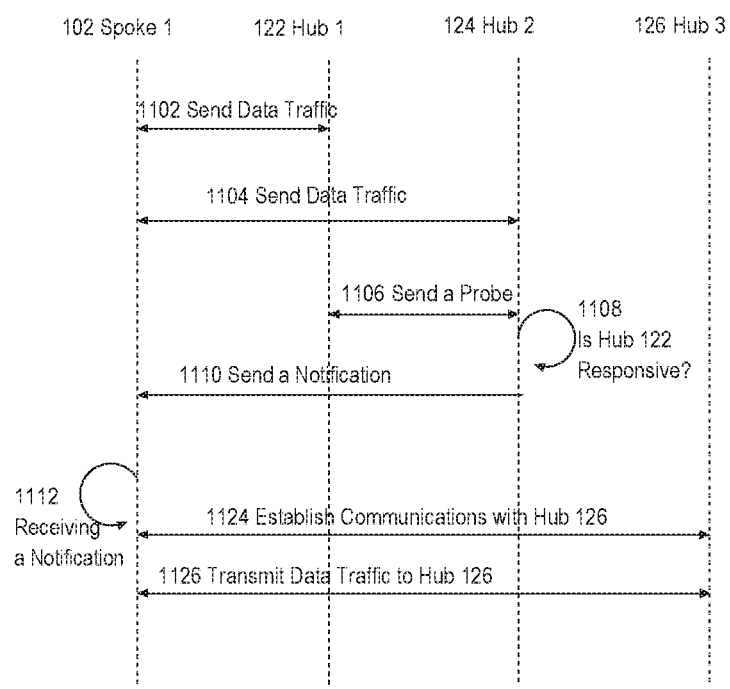
FIG. 13 illustrates a time graph for an event-driven, stateless high availability mechanism to address failure of hub devices in a hub-and-spoke network topology.

FIG. 13 is an example time graph for an approach for an event-driven stateless high-availability mechanism implementation. In the depicted example, spoke 102 established a communications link with hub 122, and established a communications link with hub 124. In step 1102, spoke 102 may send data traffic to hub 122, and in step 1104, may send data traffic to hub 124.

Hubs 122, 124 communicate probes 1106 along a high-speed communications link to each other to test whether any of the hubs has failed.

At some point in time, hub 124 determines that hub 122 became nonresponsive. For example, hub 124 may send a probe to hub 122 via a high-speed communications link, but will not receive a response to the probe from hub 122. Hub 124 may resend the probe a few times to hub 122 and set up timers for determining whether hub 122 is indeed nonresponsive.

Once hub 124 determines in step 1108 that hub 122 is indeed nonresponsive, hub 124 may generate a notification indicating that hub 122 has failed, and transmit the notification to spoke 102 in step 1110.

Upon receiving, in step 1112, a notification indicting that hub 122 failed, spoke 102 may try to find another hub, to which spoke 102 may start transmitting data traffic. For example, spoke 102 may use hub-discovery-mechanisms to find out that hub 126 is available and responsive. Thus, in step 1124, spoke 102 may establish a communications connection with hub 126, and, in step 1126, start transmitting data traffic to hub 126 instead of transmitting data traffic to hub 122.

In addition to transmitting data traffic to hub 126, in step 1126, spoke 102 may continue transmitting data traffic to hub 124.

4. Timing Considerations

Figure 12:
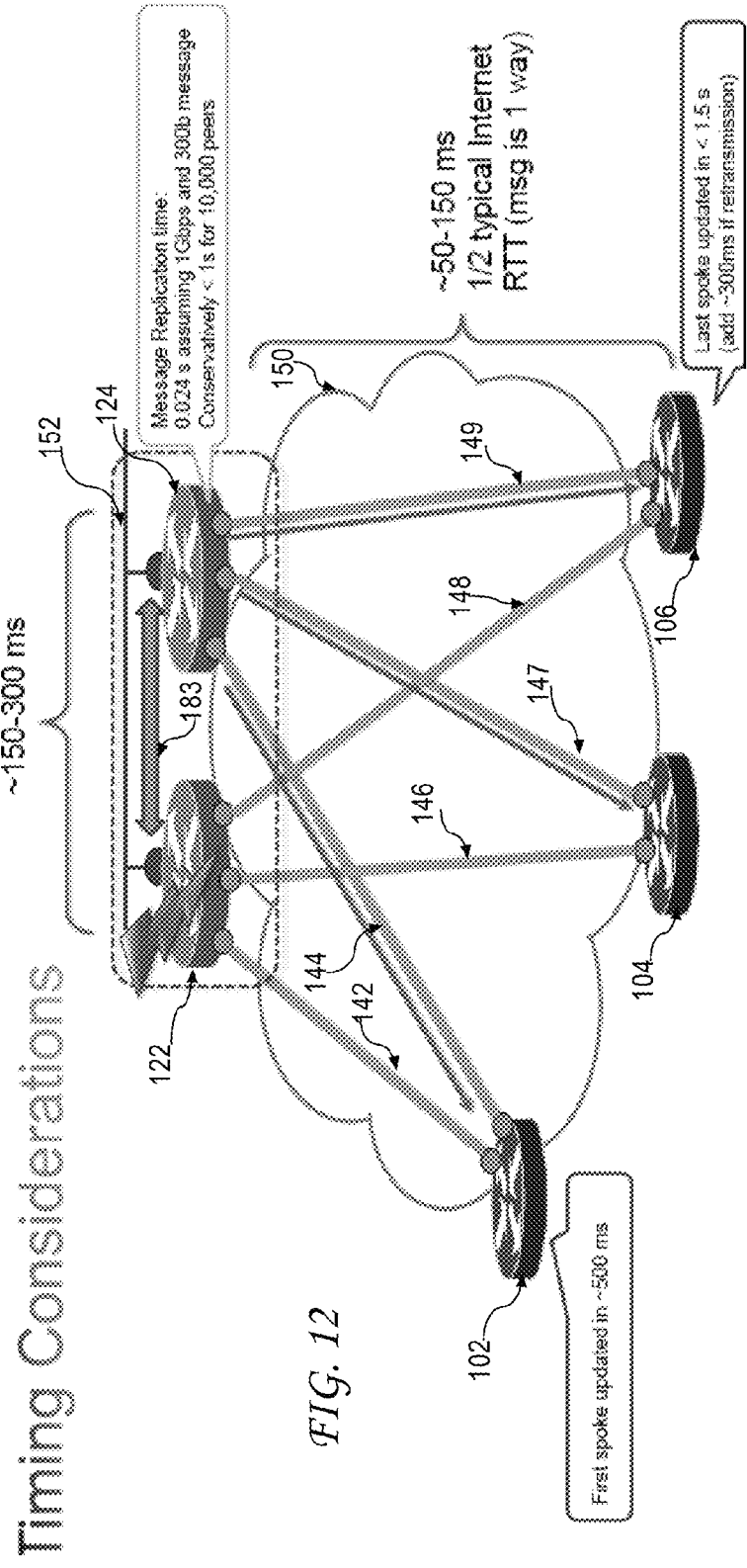
FIG. 12 illustrates an example of timing consideration.

FIG. 12 illustrates an example of timing that may be used in an embodiment. The benchmarking data is provided here to illustrate a particular implementation of an event-driven, stateless high-availability approach. In other implementations, the benchmarking data may vary.

In this example, hubs 122, 124 form a hub cluster and communicate with each other via a high-speed communications link 152. Spokes 102, 104, 106 communicate with hubs 122, 124 via respective links 142, 144, 146, 147, 148 and 149. Network 150 may be any type of network, including a WAN.

Hubs 122, 124 are configured to communicate with each other by sending probes via a high-speed link 152, which may allow hub 124 to detect a failure of hub 122 within 150 ms-300 ms from the actual hub's failure, for example.

Replication or downstream communication of related messages may proceed at similar speeds. For example, hub 124 may communicate a failure notification from hub 124 to each of spokes 102, 104, 106 and may send the failure notification to spoke 102 within 50 ms-150 ms, in an embodiment. Then, hub 124 may replicate the message, and send it to spoke 104 within a similar timeframe. Then, hub 124 may replicate the message and send it to spoke 106 within similar timing.

In an embodiment, a message replication time at a hub may be about 0.024 sec, assuming that the size of the message is about 300 bits, and the link is capable of sending messages at about 1 gigabytes/sec. In some implementations, it was shown that a hub may be capable of replicating a failure message and communicating it to up to 10,000 peers within less than 1 second.

Time considerations may be illustrated using the following example: if it takes about 150-300 ms for hub 124 to determine that hub 122 failed, and it takes about 50-150 ms for hub 124 to communicate a notification indicating that hub 122 failed to spoke 102, then spoke 102 may be informed about a failure of hub 122 within less than 500 ms. Hence, the delay from the moment hub 122 failed to the moment spoke 102 was notified about the failure may be roughly estimated to be about 500 ms. The delay from the moment hub 122 failed to the moment spoke 104 was notified may be larger than for spoke 102, and be perhaps about 1 second. The delay from the moment hub 122 failed to the moment spoke 106 was notified may be larger than for spoke 102 and spoke 104, and be perhaps about 1.4 second, or so. The provided time estimates may vary and may depend on the implementation.

5. Other Modes of Implementation

Implementations of the techniques herein in the hubs allow the hubs to probe each other, detect whether any of the hubs failed, generate notifications when a particular hub fails, transmit the notifications to other nodes including the spokes, and retransmit the notifications if the spokes do not confirm receiving the failure notifications. In addition, upon detecting a failure of a hub, the other hubs may provide not only an identification of the failed hub, but also identifications of the hubs that are still responsive. Thus, the spokes may be notified not only about the failed hubs, but also about the hubs that remain responsive and that may be used as backups.

Implementations of an event-driven, stateless high-availability mechanism in spokes allows the spokes to accept notifications from the hubs indicating failures of the hubs, and upon receiving such notifications, to update their routing tables, modify or tear down the tunnels that led to the failed hubs, select new backup hubs, and direct the data traffic to the new backup hubs.

"Stateless," in this context, means omitting the need to communicate, from an active hub to a standby hub, connection state information that otherwise must be communicated to the standby hub when a conventional stateful switchover approach is used. In stateful switchover, for example, an active node usually copies to standby node state information for the connections and data traffic handled by the active node. In the case of IPsec, this includes the IKE and IPsec Security Association data as negotiated at the beginning of the connection and updated each time a data packet is received by a hub from a spoke (to synchronize sequence numbers). Since the data traffic transmitted via an active hub may be substantial, updating the standby hub each time a data packet is received at the active hub consumes a great deal of the network resources, including CPU and bus resources. In contrast, such updating is not necessary with the approach herein. Instead, the approach herein allows achieving high speed communicating failures and in recovering from the failures without placing a high demand on the resources.

Further, in the approach herein, recovering from a hub-failure may involve some additional traffic, such as sending failure-notifications to spokes, and may involve establishing new connections between the spokes and spare hubs. However, the amount of resources utilized in handling the notifications and establishing the new connections is relatively smaller than the amount required using the stateful mechanisms. Therefore, in the approach herein, the majority of the resources, including CPUs and communications buses, may be used to handle data traffic and significant resources are not needed to notify the spokes about the failures.

6. Split-Brain Scenario

In some situations, as hubs in a hub cluster probe each other at a high-speed, some of the hubs may determine that some of the hubs failed even though such a determination may be incorrect. For example, if hub 122 and hub 124 send probes to each other, but for some reason a link between the hubs fails and neither hub receives a response to its probe, then hubs 122, 124 may assume that the other hub is non-responsible. The assumption may be incorrect because both hubs 122, 124 may remain operational even though a link between them failed. In such a situation, hub 122 assumes that hub 124 is nonresponsive, and hub 124 assumes that hub 122 is nonresponsive. Thus, even though both hubs are operational, either one assumes that the other failed. This scenario is often referred to as a split-brain syndrome or a split-brain scenario.

In a split-brain scenario, hub 122 assumes that hub 124 is nonresponsive. Thus, hub 122 generates a failure notification and disseminates the notification to spokes 102, 104, 106. At the same time, hub 124 assumes that hub 122 is nonresponsive, and therefore, hub 124 generates a failure notification and disseminates the notification to spokes 102, 104, 106. In such a situation, each of spokes 102, 104, 106 receives the notification indicating that hub 122 is nonresponsive and the notifications indicating that hub 124 is nonresponsive. If the hub cluster contains only two hubs 122, 124, then the data traffic in the network is put on hold, and the network would have to be restarted to enable the data traffic.

One way to overcome this problem is to program the spokes to detect whether the spokes receive hub-failure-notifications that are conflicting. For example, if a spoke receives a notification from hub 122 indicating that hub 124 failed and also receives a notification from hub 124 indicating that hub 122 failed, then the spoke may determine that the notifications are conflicting. The notifications are conflicting because the first notification is sent from hub 122, which according to the second notification supposed to be nonresponsive, and thus unable to send the first notification. The notifications are also conflicting because the second notification is sent from hub 124, which according to the first notification supposed to be nonresponsive, and thus unable to send the second notification.

In an embodiment, a time delay for receiving notifications from hubs is used. For example, upon receiving a notification from hub 122 indicating a failure of hub 124, a spoke may start a timer and check whether a notification from hub 124 indicating a failure of hub 122 is received before the time expires. If two or more conflicting notifications are received before the timer expires, then the spoke may determine that hubs 122, 124 experience a split-brain syndrome. Duration of the time period of the timer may depend on the implementation. For example, in some cases, the time period may be 0.5 sec, or so.

If the spokes detect receiving conflicting notifications from hubs 122, 124, then the spokes may assume that hubs 122, 124 operate in a split-brain scenario—each of them incorrectly assumes that the other is nonresponsive. In such a situations, the spokes may ignore the notifications, and continue directing data traffic to both hubs 122, 124.

The ability to disambiguate conflicting failure-notifications may be implemented in some or all spokes in the networks. The implementation of the approach for disambiguating the conflicting failure-notification provides mechanisms for overcoming problems in a network when the hubs experience a split-brain syndrome. Implementation of this approach may be a part of the implementation of the stateless high-availability mechanism.

The split-brain situation cannot be resolved in a stateful HA mechanism. Both hubs may start receiving and processing data packets and their connection database will start diverging. It is not possible to subsequently reconcile those databases in a generic way—reconciliation can only be achieved for extremely short, limited scenarios that are so rare and specific that they are usually not implemented.

7. Stateless High-Availability Mechanism for a Plurality of Hubs

The stateless high-availability mechanism may be implemented in networks that comprise not just two hubs, by any plurality of hubs. For example, the mechanism may be implemented in a network that has three or more hubs. The hubs may communicate with each other via a high-speed communications link, and may send probes to each other via the link. The probes may be used to test whether the hubs are responsive. For example, if hub 122 sends a probe to two or more other hubs, and receives responses from each of the hubs, then hub 122 may determine that the other hubs are responsive. However, if hub 122 sends a probe to two or more other hubs, but a response was not received from a particular hub, then hub 122 may determine that the particular hub is nonresponsive. In such a situation, hub 122 may send notifications to spokes 102, 104, 106 that the particular hub is nonresponsive and that spokes 102, 104, 106 may stop sending data traffic to the particular hub.

In a configuration when a hub cluster comprises two or more hubs, the hubs probe each other, and if any of the two or more hubs fails, each of the remaining responsive hubs may relatively quickly determine which hub has failed. Upon determining that a particular hub failed, the remaining responsive hubs generate notifications indicating the failure of the particular hub, and disseminate the notifications to the spokes.

In an embodiment, a spoke may receive notifications indicating that a particular hub failed from multiple hubs. For example, if a spoke has established a plurality of connections with a plurality of hubs and each of the plurality of hubs remains operational, then the spoke may receive a notification indicating that the particular hub failed from each of the plurality of hubs.

Upon receiving a notification indicating that a particular hub failed, a spoke determines whether the spoke have established a communications connection with the particular hub. If the spoke has not established such a connection, then the spoke may ignore the notification. However, if the spoke has established a communications connection with the particular hub, which is not nonresponsive, then the spoke may start a discovery process to find a backup hub that is available and responsive, and establish a communications connection with that hub.

8. Event-Driven, Stateless High-Availability Mechanism for Spokes

The approach herein for an event-driven, stateless high-availability mechanism to bypass failures also may be implemented in spokes. For example, the spokes may probe each other to determine whether any of them became nonresponsive. The spokes may send the probes to each other via a high-speed connection. Upon detecting that a particular spoke failed, other spokes may generate notifications indicating the failure of the particular spoke and communicate the notifications to the hubs. Upon receiving the notifications, the hubs may reroute data traffic to bypass the failed spoke.

Figure 11:
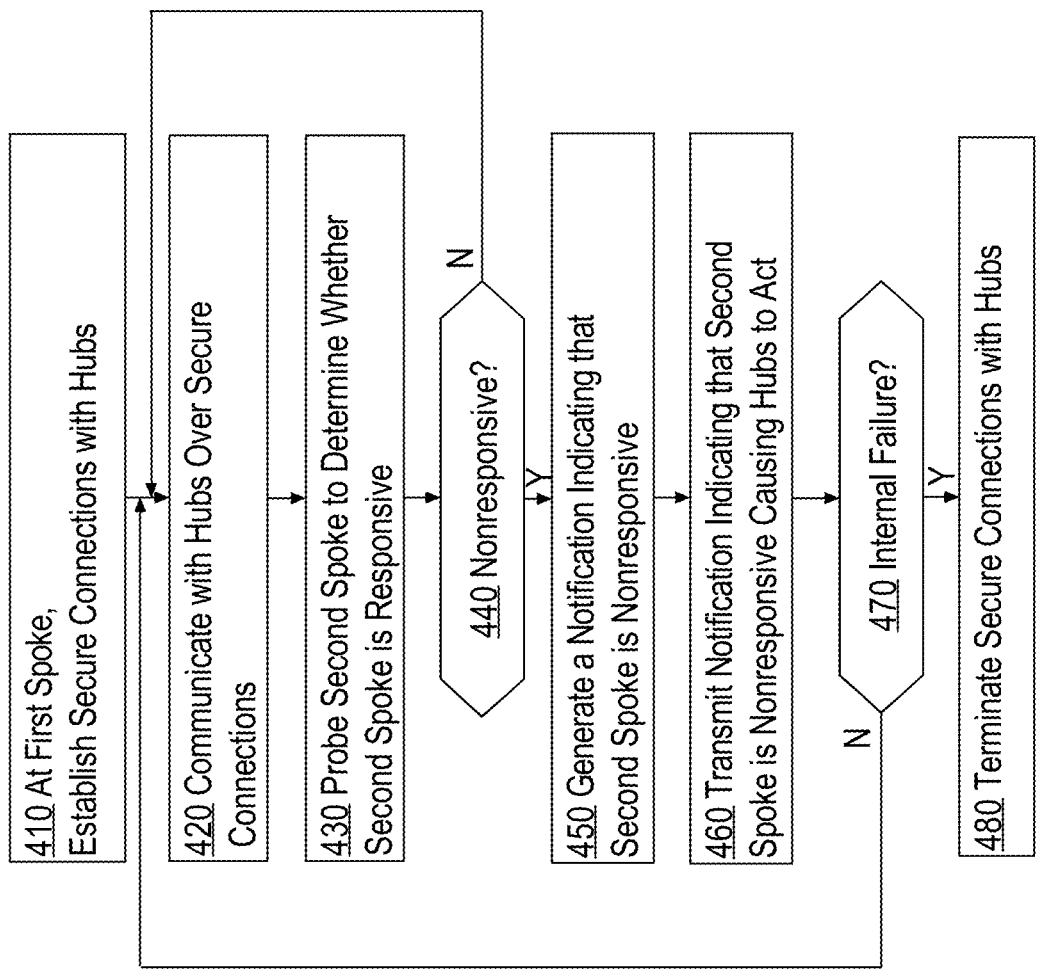
FIG. 11 illustrates a flow chart of an approach for performing a failure bypass.

FIG. 11 illustrates a flow chart of an approach for performing a failure bypass. The steps described in FIG. 11 are performed by a first spoke device that communicates with one or more spokes of a spoke cluster.

In step 410, a first spoke device establishes one or more secure connections with one or more hubs in a network.

In step 420, a first spoke device starts communicating with one or more hubs using the one or more secure connections. For example, the first spoke device may start transmitting data traffic to the hubs and receiving data traffic over the secure connections.

In step 430, a first spoke device probes other spoke devices in a spoke cluster to determine whether the other spokes are still responsive. For example, the first spoke device may send a probe to a second spoke device over a high-speed connection established between the first spoke device and the second spoke device. If the first spoke device receives no response to the probe, then the first spoke device may determine that the second spoke device has failed, or for some reason became nonresponsive.

In step 440, a first spoke device determines whether a second spoke device is nonresponsive. If the second spoke device is nonresponsive, then the process proceeds to step 450. Otherwise, the process proceeds to step 420.

In step 450, a first spoke device generates a notification indicating that a second spoke device became nonresponsive, and in step 460, the first spoke device transmits the notification to hubs in a network. For example, the first spoke device may send the notification separately to each of the hubs, or may broadcast the notification to each of the hubs at the same time.

In step 470, a first spoke device checks whether the first spoke device itself is operational. For example, the first spoke device may check whether all its data ports of the first spoke device are operational, whether all components of the first spoke device are operational, whether the components found checksum errors, and the like.

If a first spoke device determines an internal failure, then the process proceeds to step 480. Otherwise, the process proceeds to step 420.

In step 480, a first spoke device terminates secure connections that the first spoke device established with hubs. In this step, the first spoke device may not be able to notify the hubs that the first spoke device became nonresponsive. Notifying the hubs is not necessary because the failure of the first spoke device most likely has been already detected by other spokes in a spoke cluster. Upon detecting that the first spoke device has failed, the other spokes will notify the hubs about the failure of the first spoke device.

9. Other Implementation Approaches

The approaches herein may be implemented in a variety of ways. In one embodiment, a separate, standalone protocol uses high-speed communications between hubs and high-speed distribution of notifications from the hubs to the spokes.

Next Hop Resolution Protocol (NHRP) or security protocols, such as IKE, may be modified to include the notifications and messages that have been described herein.

In an embodiment, if a spoke receives a notification that a particular hub, with which the spoke have established a secure connection, failed, a security association established between the spoke and the failed hub may be preserved. For example, a security association established between the spoke and the particular hub using IPsec, or a similar security protocol, may be preserved even if the particular hub failed. The security association may be reused once the hub becomes responsive, and thus the time needed for a network recovery may be shortened.

10. Benefits of Certain Embodiments

In an embodiment, an implementation of an event-driven, stateless HA mechanism overcomes the shortcomings of conventional stateful failover approaches.

In comparison with a conventional stateless failover approach, an implementation of an event-driven, stateless HA approach allows shortening the time during which a network recovers from a failure. Furthermore, in an event-driven, stateless HA approach, the network resilience to the communications errors is usually higher than if conventional stateless failover approaches are used.

In an embodiment, a stateless HA mechanism is implemented in a computer network 150, and is based on a simple approach for delivering a high availability network. Because of its simplicity, the HA mechanism is easier to implement and less error-prone than Stateful HA. The presented HA mechanism does not impede the scalability of computer networks. Indeed, it is easily scalable and applicable to growing networks.

Another benefit of the presented approach is that the approach allows balancing the traffic in the network. For example, even if data traffic is sent from a spoke client to two or more hubs, each of which may be treated as an active hub, the traffic in the network may be balanced. This type of a configuration may be referred to as "active-active." In contrast, in a conventional stateful failover approach, if the hubs operate in the "active-active" mode, then the nodes are suspected of exhibiting a failure condition.

11. Implementation Example

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
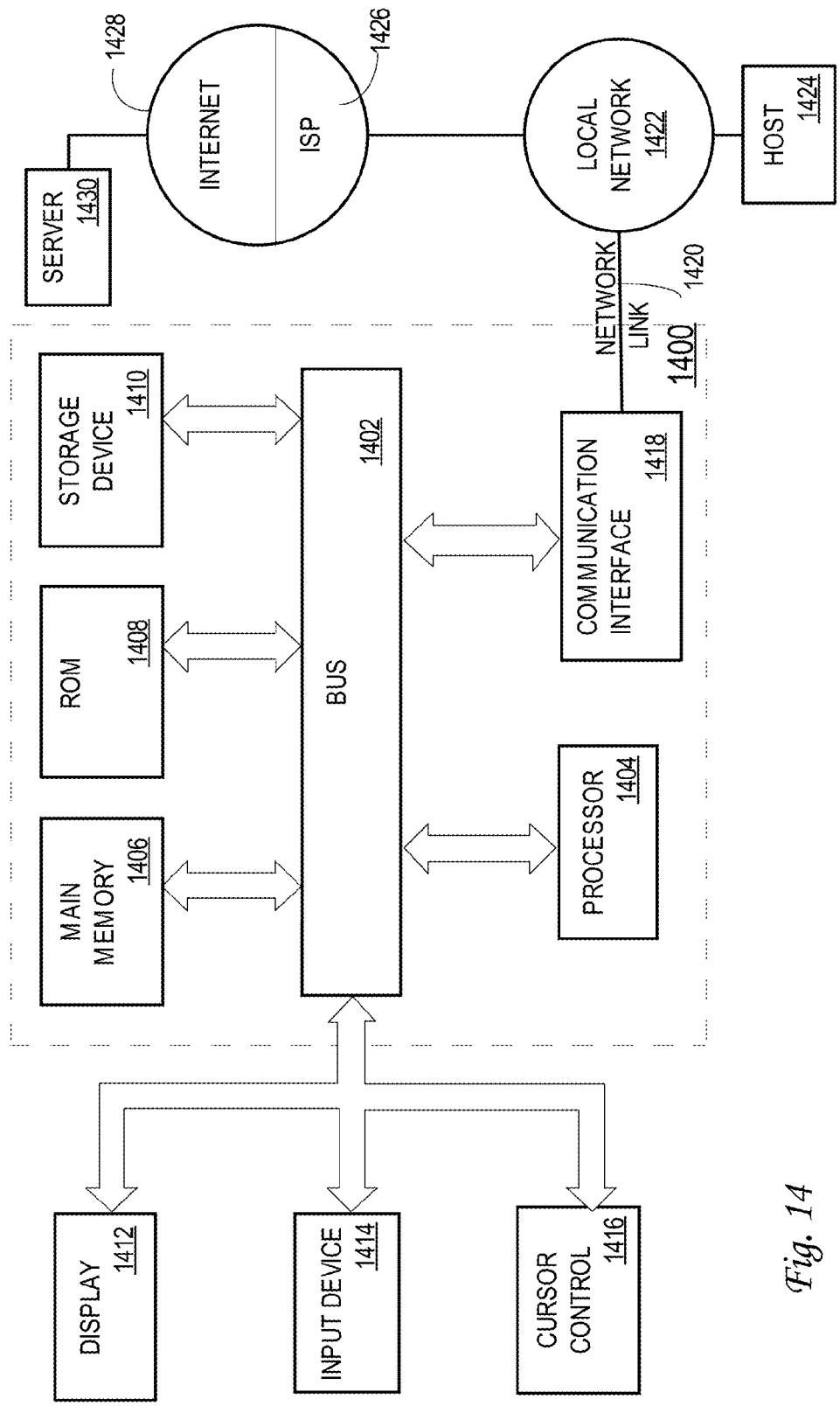
FIG. 14 illustrates a computer system with which various embodiments may be used.

For example, FIG. 14 is a block diagram that illustrates a computer system 1400 upon which an embodiment of the approach may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, optical disk, or solid-state drive is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1410. Volatile media includes dynamic memory, such as main memory 1406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid-state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A data processing system comprising:
   a first hub device comprising:
   one or more non-transitory computer-readable hub storage media storing sequences of instructions which, when executed, cause performance of:
   establishing one or more secure connections with one or more spoke devices logically arranged as spokes with respect to the data processing system;
   generating and sending via a high-speed link a hub probe to a second hub device wherein the hub probe is configured to determine whether the second hub device is responsive;
   in response to determining that the second hub device is nonresponsive, transmitting, to the one or more spoke devices over the one or more secure connections, a first communication indicating that the second hub device is nonresponsive;
   a spoke device comprising:
   one or more non-transitory computer-readable spoke storage media storing sequences of instructions which, when executed, cause performance of:
   receiving, via a low-speed link, the first communication indicating that the second hub device is nonresponsive;
   in response to receiving, via the low-speed link, the first communication that the second hub device is nonresponsive:
   determining whether the spoke device has established a secure connection with the second hub device;
   in response to determining that the spoke device has established the secure connection with the second hub device, selecting a third hub device, establishing a secure connection with the third hub device, and communicating with the third hub device.

2. The data processing system of claim 1, wherein the one or more non-transitory computer-readable spoke storage media comprise additional instructions for:
   in response to receiving the first communication indicating that the second hub device is nonresponsive and determining that the spoke device has established the secure connection with the second hub device:
   testing whether the second hub device is indeed nonresponsive;

in response to determining that the second hub device is indeed nonresponsive, tearing down the secure connection between the spoke device and the second hub device;
in response to determining that the second hub device is responsive, continuing communicating with the second hub device.

3. The data processing system of claim 1, wherein the one or more non-transitory computer-readable hub storage media comprise additional instructions for:
receiving an indication that the second hub device became responsive;
generating a message indicating that the second hub device became responsive;
transmitting the message to the one or more spoke devices.

4. The data processing system of claim 1, wherein the one or more secure connections have associated security associations.

5. The data processing system of claim 1, wherein the first hub device and the second hub device are configured to communicate using a fast probing mechanism.

6. The data processing system of claim 1, wherein the one or more non-transitory computer-readable spoke storage media comprise additional instructions for:
generating a spoke probe for testing whether the second hub device is responsive;
sending the spoke probe to the second hub device;
setting a timer to a specified time duration;
in response to determining that the specified time duration on the timer has expired, determining whether a response to the spoke probe has been received, and if so, determining that the second hub device is responsive; otherwise, determining that the second hub device is indeed nonresponsive.

7. The data processing system of claim 1, wherein the one or more non-transitory computer-readable hub storage media comprise additional instructions for:
in response to receiving a response to the hub probe from the second hub device within a first time period, determining that the second hub device is responsive and continuing communicating with one or more spokes over the one or more secure connections;
in response to not receiving the response to the hub probe from the second hub device within the first time period, determining that the second hub device is nonresponsive, generating the first communication indicating that the second hub device has failed, and transmitting the first communication to the one or more spoke devices.

8. The data processing system of claim 1, wherein the one or more non-transitory computer-readable spoke storage media comprise additional instructions for:
establishing a first secure connection with the first hub device and a second secure connection with the second hub device;
probing a second spoke device to determine whether the second spoke device is responsive;
in response to determining that the second spoke device is nonresponsive, transmitting to the first hub device and to the second hub device a second communication indicating that the second spoke device is nonresponsive, causing the first hub device and the second hub device to determine whether to select a third spoke device as a backup for the second spoke device.

9. The data processing system of claim 8, wherein the one or more non-transitory computer-readable hub storage media comprise additional instructions for:

in response to receiving the second communication indicating that the second spoke device is nonresponsive and determining that the first hub device has established a secure connection with the second spoke device:
testing whether the second spoke device is indeed nonresponsive;
in response to determining that the second spoke device is indeed nonresponsive, tearing down the secure connection between the first hub device and the second spoke device;
in response to determining that the second spoke device is responsive, continuing communicating with the second spoke device.

10. The data processing system of claim 9, wherein the one or more non-transitory computer-readable spoke storage media comprise additional instructions for:
receiving an indication that the second spoke device became responsive;
generating a message indicating that the second spoke device became responsive;
transmitting the message to the first hub device and the second hub device.

11. A data processing method comprising:
using a first hub device, establishing one or more secure connections with one or more spoke devices logically arranged as spokes with respect to a data processing system;
using the first hub device, generating and sending via a high-speed link a hub probe to a second hub device wherein the hub probe is configured to determine whether the second hub device is responsive;
using the first hub device, in response to determining that the second hub device is nonresponsive, transmitting, to the one or more spoke devices over the one or more secure connections, a first communication indicating that the second hub device is nonresponsive;
using a spoke device, receiving the first communication indicating that the second hub device is nonresponsive;
in response to receiving the first communication that the second hub device is nonresponsive:
using the spoke device, determining whether the spoke device has established a secure connection with the second hub device;
using the spoke device, in response to determining that the spoke device has established the secure connection with the second hub device, selecting a third hub device, establishing a secure connection with the third hub device, and communicating with the third hub device;
wherein the method is performed using one or more computing devices.

12. The method of claim 11, comprising:
in response to receiving the first communication indicating that the second hub device is nonresponsive and determining that the spoke device has established the secure connection with the second hub device,
using the spoke device:
testing whether the second hub device is indeed nonresponsive;
in response to determining that the second hub device is indeed nonresponsive, tearing down the secure connection between the spoke device and the second hub device;
in response to determining that the second hub device is responsive, continuing communicating with the second hub device.

13. The method of claim 11, comprising:
using the spoke device:
receiving an indication that the second hub device became responsive;
generating a message indicating that the second hub device became responsive;
transmitting the message to the one or more spoke devices.

14. The method of claim 11, comprising:
using the spoke device:
generating a spoke probe for testing whether the second hub device is responsive;
sending the spoke probe to the second hub device;
setting a timer to a specified time duration;
in response to determining that the specified time duration on the timer has expired, determining whether a response to the spoke probe has been received, and if so, determining that the second hub device is responsive; otherwise, determining that the second hub device is indeed nonresponsive.

15. A data processing system comprising:
a first hub device comprising:
one or more non-transitory computer-readable hub storage media storing sequences of instructions which, when executed, cause performance of:
establishing one or more secure connections with one or more spoke devices logically arranged as spokes with respect to the data processing system;
generating and sending via a high-speed link a hub probe to a second hub device wherein the hub probe is configured to determine whether the second hub device is responsive;
in response to determining that the second hub device is nonresponsive, transmitting, to the one or more spoke devices over the one or more secure connections, a first communication indicating that the second hub device is nonresponsive.

16. The data processing system of claim 15, wherein the one or more non-transitory computer-readable hub storage media comprise additional instructions for:
receiving an indication that the second hub device became responsive;
generating a message indicating that the second hub device became responsive;
transmitting the message to the one or more spoke devices.

17. The data processing system of claim 15, wherein the one or more non-transitory computer-readable hub storage media comprise additional instructions for:
in response to receiving a response to the hub probe from the second hub device within a first time period, determining that the second hub device is responsive and continuing communicating with one or more spokes over the one or more secure connections;
in response to not receiving the response to the hub probe from the second hub device within the first time period, determining that the second hub device is nonresponsive, generating the first communication indicating that the second hub device has failed, and transmitting the first communication to the one or more spoke devices.

18. The data processing system of claim 15, wherein the one or more non-transitory computer-readable hub storage media comprise additional instructions for:
in response to receiving the second communication indicating that the second spoke device is nonresponsive and determining that the first hub device has established a secure connection with the second spoke device:
testing whether the second spoke device is indeed nonresponsive;
in response to determining that the second spoke device is indeed nonresponsive, tearing down the secure connection between the first hub device and the second spoke device;
in response to determining that the second spoke device is responsive, continuing communicating with the second spoke device.

19. The data processing system of claim 15, wherein the one or more secure connections have associated security associations.

20. The data processing system of claim 15, wherein the first hub device and the second hub device are configured to communicate using a fast probing mechanism.

* * * * *